United States Patent [19]

van Putten

[11] 3,996,799
[45] Dec. 14, 1976

[54] DEVICE FOR MEASURING THE FLOW VELOCITY OF A MEDIUM

[76] Inventor: Antonius Ferdinandus Petrus van Putten, 13, Hofstedehoekweg, Enschede, Netherlands

[22] Filed: Sept. 29, 1975

[21] Appl. No.: 617,752

[52] U.S. Cl. ............................................. 73/204
[51] Int. Cl.² ........................................ G01F 1/68
[58] Field of Search ..................................... 73/204

[56] References Cited

UNITED STATES PATENTS

| 3,258,760 | 6/1966 | Carlson et al. | 73/204 |
| 3,352,154 | 11/1967 | Djorup | 73/189 |
| 3,677,085 | 7/1972 | Hayakaw | 73/204 |
| 3,800,592 | 4/1974 | Jones Jr. | 73/204 |
| 3,830,104 | 8/1974 | Gou | 73/204 |
| 3,900,819 | 8/1975 | Djorup | 73/204 |

OTHER PUBLICATIONS

Williams, "Integrated Circuit Temperature Determining Apparatus" RCA Tn. No. 644 Aug. 1965.

*Primary Examiner*—Herbert Goldstein
*Attorney, Agent, or Firm*—Woodhams, Blanchard and Flynn

[57] ABSTRACT

A device for measuring the flow velocity of a medium, comprising four thin film resistors, deposited on a semiconductor chip with dimensions of about 0.06 inch by 0.06 inch, said resistors being connected into a bridge configuration of which two bridgepoints are connected to at least one amplifier which is formed as an integrated amplifier in the space on the chip inside the resistors.

11 Claims, 5 Drawing Figures

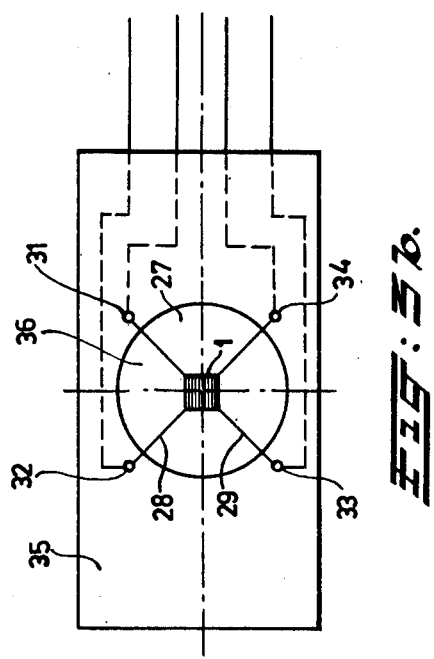
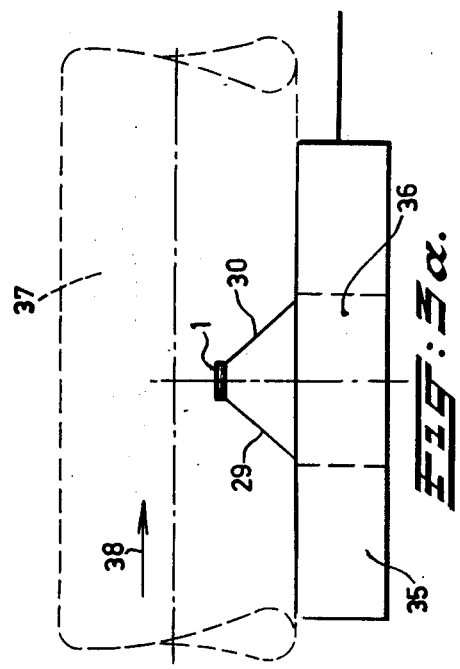
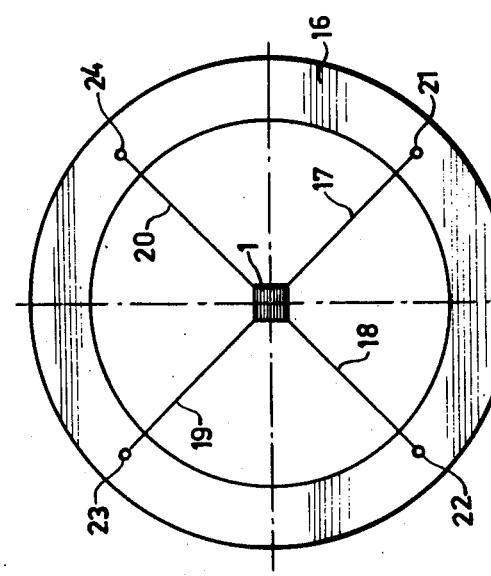
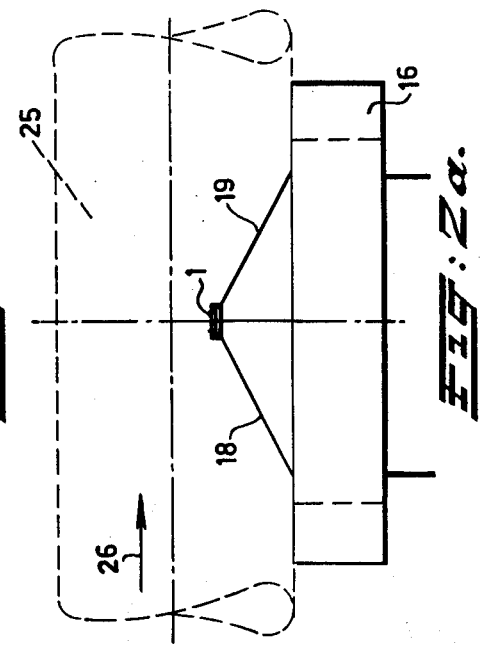

DEVICE FOR MEASURING THE FLOW VELOCITY OF A MEDIUM

BACKGROUND OF THE INVENTION

Measurement of flow velocities of a medium using a temperature sensitive electrical resistor which is cooled by the medium which flows around it in dependence of the flow velocity thereof, thereby changing the resistance, are known.

These known devices all comprise three discrete elements: the sensor wire, an amplifier for amplifying the measuring signal obtained as a result of the change of the resistivity of the measuring resistor, and a signal display device. As a result such devices occupy a lot of space and are not cheap to produce, as each sensing resistor must be connected to its own amplifier. An arrangement in which many sensors are used, for instance when measuring flow velocities on many points on a model of an aeroplane, such as done at windtunnel tests becomes very complicated and expensive.

SUMMARY OF THE INVENTION

The invention provides a flow velocity measuring device of very small dimensions in which both the sensing resistors and the amplifier for amplifying the measuring signal are provided by usual planar silicon technology on a semiconductor chip of about 0.06 inch × 0.06 inch. The amplifiers are provided in the centre of the chip in the space delimited by the sensing resistors. The chip is mounted in such a way that two of the resistors are normal to the flow and the two other ones parallel to the flow. The temperature decrease of the resistors which are normal to the flow is somewhat larger than that of the resistors which are parallel to the flow and as a result of the positive temperature coefficient of the diffused resistors the bridge becomes unbalanced. The bridge output signal is then a measure of the velocity of the medium flow and when the cross-section of the conduit in which the medium flows is known, also of the debit.

The invention thus provides for a device for measuring the flow velocity of a medium, comprising two, flat, temperaturesensitive elongated sensing resistors deposited on an insulating semiconductor chip with two respective longitudinal axes including an angle of about 90°, said resistors being connected with two other resistors into a bridge configuration of which two opposite points are connected to a current source and of which the two other opposite points are connected to the input of an amplifier made as an integrated circuit of very small dimensions of which the components are deposited on the semiconductor chip in the space delimited by the two sensing resistors.

With a view of obtaining a compensation for bridge signals resulting from a change in ambient temperature at the absence of flow three amplifiers are provided on the chip, the input of the first one being connected to the opposite points of the bridge, the inputs of the second one being connected across one of the resistors and the outputs of the first and the second amplifier being connected to the input of the third amplifier with the output constitutes the output of the device.

The device according to the invention has, as a result of its small dimensions and low cost a great many applications, not only in the field of technics, research (metereological and aeronautical) and the medical field (lung research, blood flow measurements), but also in the domestic field. It can be made very cheaply in great quantities with excellent reproduceability at the same high standards with which modern semiconductors devices are made.

SURVEY OF THE DRAWINGS

FIG. 2A is a side view of this device, mounted on a conduit through which a medium flows;

FIG. 2B is a plan view of this device;

FIG. 3A is a side view of another embodiment, also mounted on a conduit through which a medium flow is present;

FIG. 3B is a plan view of this device.

Figure 1:
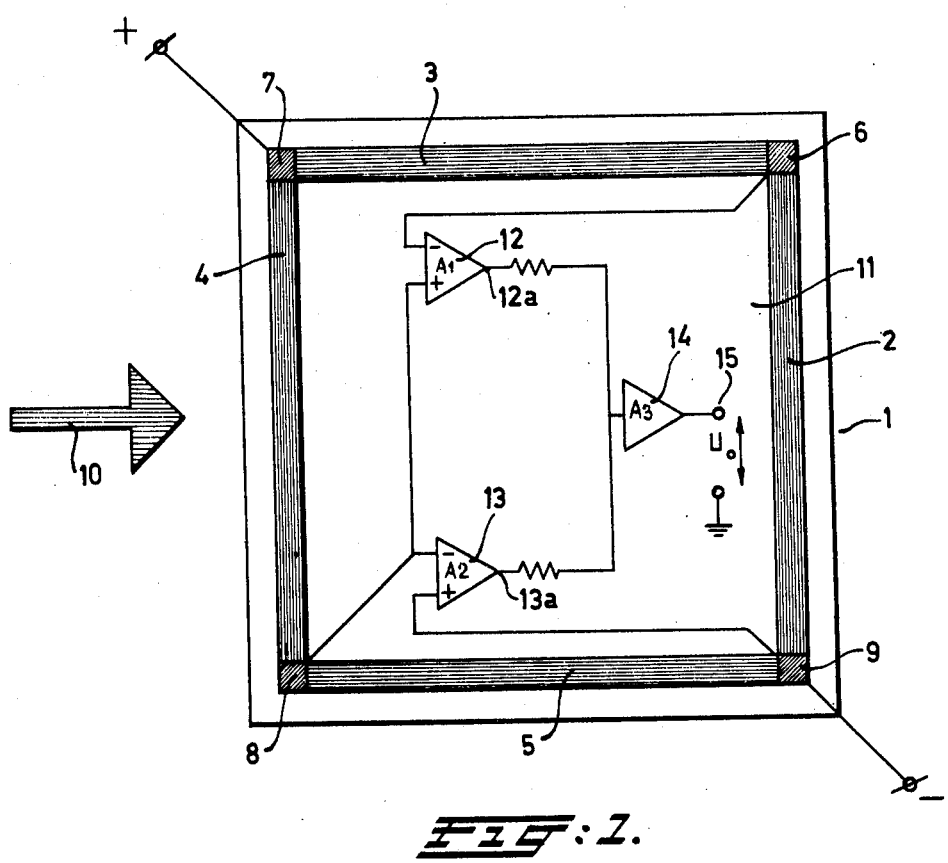
FIG. 1 is schematical plan view of a device according to the invention.

FIG. 1 shows on a very enlarged scale — about 60 : 1 — a silicon chip with dimensions of about 0.06 inch × 0.06 inch, denoted by the reference numeral 1, on which four p-type diffused resistors are provided by the usual planar technology. These resistors are denoted by the reference numerals 2, 3, 4 and 5. There are four contact areas, e.g. of aluminum film, denoted by the reference numerals 6, 7, 8 and 9. The four resistors 2, 3, 4, and 5 are thus connected into a bridge configuration; the contact areas 7 and 9 are connected to a current, denoted by the symbols + and −, while the bridge signal is taken between the contact areas 6 and 8. This bridge signal results from the fact that the heat transfer from the resistors to the medium which flows around it (in the direction of the arrow 10) is greater for the resistors which are normal to the flow (in this case the resistors 2 and 4) than for the resistors which are parallel to the flow (the resistors 3 and 5). The heat transfer characteristics are generally represented by the formula $Nu = A + Q \mathcal{F}(\alpha)$, in which $Nu$ is the Nusselt number for total heat transfer, A is a structure-dependent constant associated with nonflow-dependent heat losses, $Q$ is the flow-dependent forced-convection heat transfer and $\mathcal{F}(\alpha)$ is a function that accounts for the dependence of the heat flow on the angle $\alpha$ between the normal to the diffused resistor and the direction of the flow. The principle of the sensor is thus based on the difference $\mathcal{F}(\alpha)$ between the parallel and the normal resistors. To keep the term A, which is mainly a result of heat conduction within the substrate, as small as possible a chip is used with a thickness of 50 $\mu$m.

With four perfectly equal resistors 2, 3, 4 and 5 it may be expected that the sensor is insensitive for changes of the ambient temperature. However, in most cases it will not be possible to obtain four perfectly equal resistors and for this reason a signal is derived from one of the resistors which is dependent upon the ambient temperature and added as a compensating signal to the measuring signal taken between the points 6 and 8.

In the space 11, delimited by the four resistors 2, 3, 4 and 5 are three integrated amplifiers 12, 13 and 14, each made by the usual technology and schematically represented by the symbol commonly used for an amplifier. The − input of the first amplifier 12 is connected to the contact area 6 while the + input of the amplifier is connected to the contact terminal 8; the bridge signal thus appears in amplified form at the output 12a of the amplifier 12. The − input of the second amplifier 13 is connected to the contact area 8 while the + input of this amplifier 13 is connected to the contact area 9; at the output 13a thus appears a signal which represents the changes of the resistivity of the resistor 5 with changes in ambient temperature. The outputs 12a and 13a are connected with the input of the third amplifier 14 and at the output 15 of this amplifier appears the output signal of the bridge. The supply voltages for the amplifiers 12, 13 and 14 are taken from the contact areas 7 and 9.

The FIGS. 2A, 2B, 3A and 3B show two different examples of embodiments of the mounting of the chip 1. FIG. 2B shows a ringshaped supporting element 16 made of suitable material, such as plastics or a ceramic material which carries four thin contact wires 17, 18 19 and 20 connected to the respective terminals 21, 22, 23, 24 on the supporting elements. The other ends of the wires 17–20 are bonded to suitable contact areas on the chip 1, not shown. FIG. 2A shows how this ring is connected to a conduit 25 through which a medium flows in the direction of the arrow 26.

FIGS. 3A and 3B show another embodiment. Here the chip 1 is again supported by four wires 27, 28, 29, 30 which at the one end are connected to terminals 31, 32, 33, 34 and at the other end bonded to contact areas on the chip 1, not shown. The terminals 31, 32 33, 34 are provided in a block-shaped supporting element 35 of e.g. plastics or a ceramic material with the circular opening 36. This supporting element is mounted on the conduit 37 through which the medium flows in the direction of the arrow 38.

In a practical embodiment, using a silicon chip of about 0.06 × 0.06 inch with a thickness of 50 $\mu$m, with p-type diffuse resistors with a resistivity of about 300 ohm/square and a width - to length ratio of 1:45, the bridge produced a direct current output signal of 2 $\mu$ Volt per meter per second airflow; temperature compensation was obtained keeping the ratio ohm/temperature constant for temperatures up to 70° centigrade.

What I claim is:

1. Device for measuring the flow velocity of a medium, comprising an insulating silicon, semiconductor chip, two flat temperature sensitive elongated sensing resistors deposited on said silicon semiconductor chip with two respective longitudinal axes including an angle of about 90°, two other resistors on said chip, said first-mentioned resistors being connected with said two other resistors into a bridge configuration of which two opposite points are connected to a current source, an amplifier made as an integrated circuit of very small dimensions of which the components are deposited on the semiconductor chip in the space delimited by the sensing resistors, the two other opposite points of said bridge configuration on said chip being connected to the input of said amplifier on said chip.

2. Device according to claim 1, in which the silicon chip has deposited thereon four p-type diffused resistors connected into a Wheatstone bridge configuration.

3. Device according to claim 1 in which each resistor has a resistivity of about 300 ohm/square and a width-length ratio of about 1:45.

4. A device according to claim 1 in which the resistors are each enclosed by two elongated metal film contact strips.

5. A device according to claim 1, in which the resistors are each connected by the respective ends to a metal film contact area.

6. A device according to claim 1, in which the chip is supported by a number of contact wires, one end of each wire being bounded to a contact area on the chip, the other end being connected to a supporting element.

7. Device for measuring the flow velocity of a medium, comprising:
a relatively thin platelike semiconductor chip having front and back faces, which chip is mountable in a flow to monitor flow velocity;
an integrated circuit amplifier, the components of which are deposited on one said face of the semiconductor chip in the control portion thereof;
four elongate flat resistive strips deposited on said one face of the chip, said strips conductively connected end-to-end and forming a border loosely around said integrated circuit amplifier inboard of the chip edges, each of the strips forming a side of the border and including four contact areas on the chip at the corners of the border establishing said end-to-end connection of said strips and closing the border peripherally, wherein the chip is locatable in a flow of medium with two opposite strips substantially parallel to the flow and the remaining two opposed strips substantially perpendicular to the flow;
one diagonally opposed pair of said corner contact areas being supply voltage connection points, means extending inboard from the diagonally opposed corners of the border and conductively connecting the other diagonally opposed pair of corner contact areas to respective signal inputs of said integrated circuit amplifier within said border.

8. A device according to claim 7 including an insulative supporting element having terminals spaced in a circumferential manner on a surface thereof orientable toward the path of a flow to be measured, wires fixed to and supported by respective said terminals and extending convergently away from said surface of said supporting element substantially in frusto-pyramidal fashion, with the free ends of said wires being bonded to spaced points on said chip for mounting same on and in spaced and facing relation to said support element, whereby the chip is operably positionable in such fluid flow path.

9. A device according to claim 8, in which said amplifier comprises three individual amplifier units deposited on the central portion of said chip face within said border, the first and second amplifier units each having an output coupled to the third, the first amplifier unit having respective inputs connected to said other pair of diagonally opposed corner contact areas for receiving a signal representing flow velocity from said resistive strips, the second amplifier unit having its inputs connected across one of said resistive strips and providing a temperasture compensating signal.

10. A device according to claim 9 in which the chip has a face size of about 0.06 inch by 0.06 inch and thickness of about 50 $\mu$m.

11. A device according to claim 10 in which said strips have a length to width ratio of about 45 to 1 and a resistivity of about 300 ohm/square.

* * * * *